(12) United States Patent
Tani et al.

(10) Patent No.: US 8,940,372 B2
(45) Date of Patent: Jan. 27, 2015

(54) METHOD FOR TREATING A SURFACE OF A SUBSTRATE

(75) Inventors: Petri Tani, Hillosensalmi (FI); Harri Kosonen, Lappeenranta (FI)

(73) Assignee: Upm-Kymmene Corporation, Helsinki (FI)

( * ) Notice: Subject to any disclaimer, the term of this patent is extended or adjusted under 35 U.S.C. 154(b) by 308 days.

(21) Appl. No.: 13/263,882

(22) PCT Filed: Apr. 9, 2010

(86) PCT No.: PCT/FI2010/050290
§ 371 (c)(1),
(2), (4) Date: Jan. 3, 2012

(87) PCT Pub. No.: WO2010/116045
PCT Pub. Date: Oct. 14, 2010

(65) Prior Publication Data
US 2012/0094101 A1     Apr. 19, 2012

(30) Foreign Application Priority Data
Apr. 9, 2009 (FI) .................................. 20095392

(51) Int. Cl.
| B05D 5/00 | (2006.01) |
| D21H 17/13 | (2006.01) |
| C08J 7/12 | (2006.01) |
| D21H 17/59 | (2006.01) |
| D21H 19/32 | (2006.01) |
| D21H 19/80 | (2006.01) |
| D21H 27/00 | (2006.01) |
| D21H 27/06 | (2006.01) |

(52) U.S. Cl.
CPC . *D21H 17/13* (2013.01); *C08J 7/12* (2013.01); *D21H 17/59* (2013.01); *D21H 19/32* (2013.01); *D21H 19/80* (2013.01); *D21H 27/001* (2013.01); *D21H 27/06* (2013.01)
USPC .................. 427/411; 427/412.1; 427/421.1; 427/315; 427/377

(58) Field of Classification Search
None
See application file for complete search history.

(56) References Cited

U.S. PATENT DOCUMENTS

| 3,691,206 A | 9/1972 | Northrup |
| 2006/0204703 A1 | 9/2006 | Bacher et al. |
| 2007/0004859 A1 | 1/2007 | Bacher et al. |
| 2007/0059539 A1 | 3/2007 | Doehler et al. |

FOREIGN PATENT DOCUMENTS

| CA | 2614222 A1 | 1/2007 |
| DE | 102007053030 A1 * | 5/2009 |
| EP | 0 008 799 A1 * | 3/1980 |
| EP | 0541038 A1 | 5/1993 |
| EP | 0563704 A1 | 10/1993 |
| EP | 0718432 A1 | 6/1996 |
| EP | 1 764 394 A1 * | 3/2007 |
| EP | 1764394 A1 | 3/2007 |
| GB | 2068397 A | 8/1981 |
| JP | 04041451 | 2/1992 |
| WO | WO-2007/003059 A1 | 1/2007 |
| WO | WO 2007/003059 A1 * | 1/2007 |
| WO | WO-2009/147283 A1 | 12/2009 |

OTHER PUBLICATIONS

PCT/ISA/210—International Search Report—Sep. 29, 2010.

* cited by examiner

*Primary Examiner* — William Phillip Fletcher, III
(74) *Attorney, Agent, or Firm* — Venable LLP; Eric J. Franklin

(57) ABSTRACT

A method for treating a surface of a substrate. A functional chemical is applied onto the surface of the substrate for improving the adhesion of silicone to the substrate. The functional chemical is applied in an amount of at least 5 mg/m$^2$ onto the surface of the substrate by using a steam application beam to form a functional chemical layer on the substrate. The functional chemical includes double bonds, silane hydride, or vinyl silane reactive groups, or oligomeric or polymeric hydrocarbon or polysiloxane compounds.

14 Claims, 1 Drawing Sheet

METHOD FOR TREATING A SURFACE OF A SUBSTRATE

CROSS-REFERENCE TO RELATED APPLICATIONS

This application claims priority under 35 U.S.C. §119 to Finnish patent application 20095392 filed 9 Apr. 2009 and is the national phase under 35 U.S.C. §371 of PCT/FI2010/050290 filed 9 Apr. 2010.

FIELD OF THE INVENTION

The present invention relates to a method for treating a surface of a substrate for improving the adhesion of silicone to the substrate and thereby preventing silicone rub-off. The method comprises applying a functional chemical onto the surface of the substrate by using a steam application beam to form a functional chemical layer on the substrate for improving the adhesion of silicon to said substrate. The invention also relates to a release liner which comprises a substrate treated with the method according to the invention.

BACKGROUND OF THE INVENTION

Release coatings, such as silicone coatings, have been used for enhancing release properties of a substrate, such as paper, film or plastic coated paper substrate. The silicone coating may form a release layer for a release liner, or the silicone coating may be, for example, a functional layer of baking paper.

In the case of release liners, where silicone is applied onto substrate surface, the adhesion in the interface of these two layers can remain too weak, resulting in delamination problems. Therefore, when producing silicone coated papers or other substrates, good adhesion of silicone and low rub-off is desired. In addition, special attention must be paid to the quality of the non-siliconized base material in order to minimize the amount of the silicone coating.

Typically, attempts have been made to improve the adhesion of silicone by admixing some additives into silicone. Functional chemicals have also been developed, which can prevent the rub-off of silicone by anchoring silicone to a surface of the substrate. The structure of these functional chemicals comprises a moiety or moieties that are compatible with the substrate, and a moiety or moieties that are reactive or at least compatible with the silicone coating. The functional chemical can comprise at least one end or side functionalized block or graft copolymer with groups capable of reacting with the silicone. The functional chemical can also be a copolymer which contains groups after polymerization capable to react with the silicone. Therefore, the functional chemicals are capable of forming covalent bonds at the interface between the silicone and the substrate, and in this way the adhesion of silicone can be improved.

A problem with the above described functional chemicals is that they involve high costs and can therefore be commercially used in low addition ratios only. If these functional chemicals are mixed into a coating agent or surface size and applied on the surface of the substrate with common coating equipment, only a minor proportion of the functional chemical finds the surface of the substrate. This leads to a high consumption of the functional chemical and possibly non-homogenous adhesion of silicone.

Therefore, there is a need for a novel method to treat the surface of a substrate with a very low amount of functional chemical, resulting in considerable cost savings. In addition, the novel application method should create a uniform layer of the chemical on the surface of the substrate in order to achieve a desired functionality.

SUMMARY OF THE INVENTION

The aim of the present invention is to present a novel method for treating a surface of the substrate in such a way that the functional chemical is needed only in a low coat weights, so that silicone rub-off can be prevented.

To achieve these aims, the method according to the invention for treating a surface of a substrate for improving the adhesion of silicone to a substrate is primarily characterized in that the method comprises:

applying said functional chemical in an amount of at least 5 mg/m$^2$ onto the surface of the substrate by using a steam application beam to form a functional chemical layer on the substrate, which functional chemical comprises vinylic, silane hydride, or vinyl silane reactive groups or double bonds, preferably end or side groups, or oligomeric or polymeric hydrocarbon or polysiloxane compounds.

The basic idea of the method according to the invention is to create a thin functional layer on the surface of a substrate for improving the substrate surface characteristics which are needed for continued treatment of the substrate with silicone. The thin functional layer right between the substrate and the silicone layer improves the adhesion of silicone.

The method according to the invention utilizes high velocity steam to distribute water soluble, water dispersible or water emulsifiable functional chemicals onto the substrate surface. The method is carried out by a steam application beam which has a specific nozzle system and capability to apply functional chemical(s) in aqueous form with steam. The nozzle system in the steam applicator is designed to create good mixing efficiency of the steam and the functional chemical(s). The nozzle system feeds the functional chemical(s) solution into a steam flow in the application chamber where very fine mist of functional chemical(s) is being formed. Small droplet size of the functional chemical solution gives the possibility to apply a uniform layer onto the surface of the substrate in low coat weight.

The steam applicator preferably used in the method according to the invention is a commercial solution from HU Jakob Papiertechnik AG, Switzerland, which has been presented in patent publication WO2007/003059. This steam applicator is mainly used to apply steam in which water is applied to increase the moisturizing effect. Now, it has been found that this kind of a steam application beam having the specific nozzle system can also be utilized for treating the surface of the substrate with functional chemicals in order to form the thin functional layer right on the uppermost surface of the substrate. However, the invention is not limited to the use of this certain steam application beam, but other steam application beams providing the same kind of a distribution method are also applicable.

The functional chemical layer formed by using the steam application beam comprises at least 5 mg/m$^2$ of the functional chemical. Preferably, the coat weight is about 0.05 g/m$^2$, but depending on the further processing of the substrate and the end use of the treated substrate, the coat weight can also be above 0.05 g/m$^2$. By using the steam application beam it is possible to form this kind of low weight functional layer.

The substrate can be a non-coated or pre-coated substrate. The substrate is made of paper, film (plastic) material, or film (plastic) coated paper. The paper substrate may be coated, sized or otherwise surface treated. The paper substrate can also be calandered or non-calandered. The film material substrate can be made of a thermoplastic polymeric material, advantageously polyethylene terephthalate (PET), orientated polypropylene (OPP), low density polyethylene (LDPE), or high density polyethylene (HDPE).

The improvement in adhesion is based on the structure of a functional chemical which is applied on the substrate. The functional chemical can be a functional polymer or a low molecular weight chemical, which comprises a moiety or moieties that are compatible with substrate, and a moiety or moieties that are reactive or at least compatible with the silicone coating. The functional chemical can make possible a covalent binding between silicone coating and the surface of the functional layer. The functional chemicals used in the method according to the invention are applied on the surface of the substrate in water in the form of a solution, a dispersion or an emulsion, and the chemical is chosen on the basis of the silicone coating and the end use of the base material.

The above described steam beam technique enables the application of functional chemicals right on the uppermost surface of the substrate which is needed to create strong interaction with another layer such as silicone. The method according to the invention makes it possible to treat a substrate web, e.g. the base paper web of a release liner, during the paper manufacturing and so the base paper comprising the functional layer can be supplied to the manufacturers of the release paper and they do not need to use any additives for improving the adhesion of coatings.

The invention was developed particularly to improve the adhesion in the interface of silicone layer and substrate in the case of release liners. But also other uses, in which good silicone adhesion is required, are possible. In addition, the invention was also developed in the point of view of specific functional chemicals which cannot be used in industrial applications due to economical reasons, if conventional coating methods are used. The method according to the invention is suitable for all water soluble or water dispersible functional chemicals, and it is not limited to the chemicals presented in this description.

BRIEF DESCRIPTION OF THE DRAWINGS

In the following, the invention will be described by means of examples and illustrated by referring to drawings in which.

DETAILED DESCRIPTION OF EMBODIMENTS OF THE INVENTION

Figure 1:
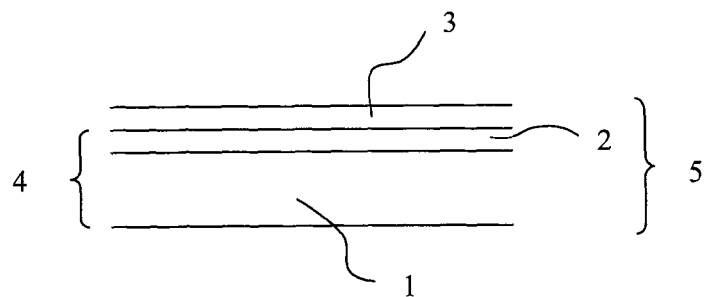
FIG. 1 shows the structure of a release liner which comprises a substrate treated with the method according to the invention.

FIG. 1 shows a structure of a release liner 5, which is manufactured from a substrate 1 treated with the method according to the invention. The release liner 5 comprises the substrate 1, a functional layer 2 on the surface of the substrate, and a coating layer 3 on top of the functional layer 2. The substrate refers to a paper substrate, a film (plastic) substrate, or a film (plastic) coated paper substrate. The paper substrate may be coated, sized or otherwise surface treated (not presented in FIG. 1). The coating layer 3 refers to a silicone coating, and the functional layer 2 comprises the functional chemical which is capable of reacting with a silicone or which is compatible with silicone. In the many cases the gross-linking of the silicone coating 3 is based on the hydrosilyla-tion reaction between the double bonds and silane hydride groups in the presence of platinum catalyst. During the cross-linking reactive groups of silicone can also firmly react with the functional layer. The silicone coating may be based on, for example, a solvent-containing silicone, solvent free silicone, UV curing silicone, or an emulsion silicone.

The present invention provides a novel method for forming a functional chemical layer 2 on the surface of the substrate 1. When the functional chemical is applied on a substrate, a base material 4 is formed. The base material 4, which comprises substrate 1 and a functional layer 2, can be manufactured separately from the silicone coating process.

A functional chemical layer is formed by using a steam application beam in such a way that a functional chemical solution is mixed to the steam. The concentration of the functional chemical e.g. in the case of polymer solution is below 15 wt-%. Preferably, the concentration is below 4 wt-%. Operating conditions of the steam application beam are as normally used. The operating temperature of the steam application beam is about 90 to 120° C., and the steam pressure is about 1 to 1.5 bar.

The nozzles of the steam application beam apply the functional chemical solution onto the substrate web in a continuous manner, and a uniform thin functional layer can be formed.

The functionalized chemicals distributed in the method according to the invention to the surface of the substrate can be polymeric functional chemicals, which comprise at least one end or side functionalized block or graft copolymer with groups capable of reacting with a silicone or groups which are compatible with silicone.

The functional chemical can also be a low molecular weight functional chemical comprising a moiety or moieties that are reactive or compatible with silicone and a moiety or moieties that are reactive or compatible with a substrate surface. In this case, the concentration of the functional chemical in the solution can be higher than 15 wt-%.

Figure 2:
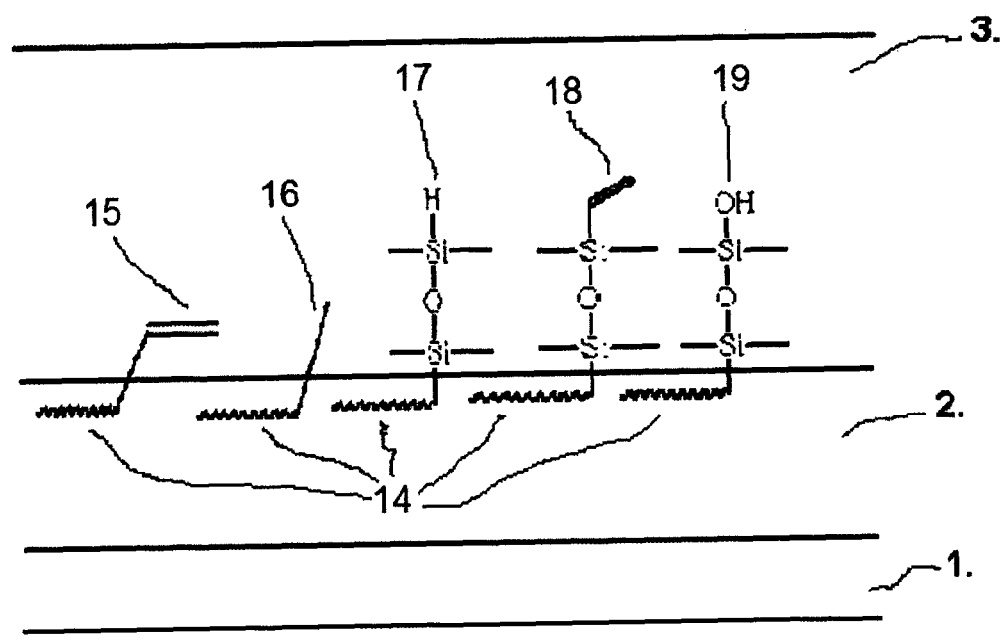
FIG. 2 shows some polymer structures of the functional chemical, which can be applied onto the surface of the substrate by the method according to the invention.

FIG. 2 shows some advantageous polymer structures of the functional chemical which can be used as a functional layer to provide better adhesion between the silicone coating and the substrate. The release liner comprises a substrate 1, a functional layer 2, and a coating layer 3. The adhesion of the coating layer to the substrate can be improved by using functionalized polymers which comprise both a moiety 14 that is compatible with the substrate, and a moiety 15-19 that is reactive or compatible with the silicone coating 3. The reactive moiety preferably contains vinylic 15, silane hydride 17, or vinyl silane 18 end or side groups which can react with silicone coatings in a hydrosilation reaction. The coating-compatible moiety is preferably an oligomeric or polymeric hydrocarbon 16 or polysiloxane 19 which can improve the adhesion of the silicon layer by mixing and physical bonding.

The moiety 14 is typically compatible with the substrate if the substrate comprises same or similar groups as said moiety. For example, the moiety 14 comprising hydrophilic groups is typically compatible with the hydrophilic substrate. Usually moiety with, for example, O- or N-atoms is hydrophilic. Similarly, the moiety 14 comprising hydrophobic groups is typically compatible with the hydrophobic substrate. Usually moiety with, for example, hydrocarbons is hydrophobic.

The functional chemical comprises a polymeric backbone. The polymeric backbone is preferably water-soluble or water-dispersible. It can be selected, for example, from the group of polyvinyl alcohol, polyethylene glycol, polyethylene oxide, polyvinyl amine, starch, starch ester, starch ether, carboxymethyl cellulose, carboxymethyl cellulose ether, carboxymethyl cellulose ester, chitosan, xanthan, or polyacrylamide. The polymeric backbone is preferably polyvinyl alcohol or starch.

The functional chemical preferably comprises double bonds which can react with silicone coating. Advantageously at least some double bonds are located at the end of the side chains of the polymeric backbone The typical substrate for a release liner is paper, for instance glassine paper. Glassine refers to a paper which is made of chemical pulp and whose grammage is typically from 50 to 150 g/m². Good transparency is typically required of the glassine paper; for a 60 g/m² paper, it is typically at least 45, measured with visible light (ISO 2469:1994). In the manufacture of the glassine paper, paper pulp is ground finely so that a dense, substantially unporous paper is achieved. Because glassine paper is used as the base paper for release paper, a poreless surface is a requirement for good siliconizability. The poreless surface can be achieved with calendering treatments and surface treatment. The paper can be either calendered first and then surface treated, or surface treated first and then calendered. The calender can be a multi-nip calender or a supercalender. In the calender, at least one nip is formed between a hard-faced roll and a soft counter surface.

After applying the functional chemical on the base paper, the paper can be siliconized. The hydrosilation reaction takes place between the reactive functional chemical layer and reactive groups of the silicon-containing release agent on top of the functional layer. Thus, a firm bond is formed between the paper and the coating.

The following examples describe the forming of functional layer on the paper surface and also how the silicone rub-off can be eliminated by using the functional chemical layer between the base paper and silicone coating.

Example 1

The steam applicator (HU Jakob Papiertechnik AG, Switzerland) was tested in production scale by applying steam and functional chemical solution (PVOH-$C_5$-s-5%) at a supercalender. The polymeric backbone of PVOH-$C_5$-s-5% is a polyvinyl alcohol with the degree of hydrolysis 98%. Nominally, 5 of the hydroxyl groups of the polymer are grafted with a side chain comprising 5 carbons and a double bond at the end of the side chain. The steam applicator was mounted between the unwinding station and the first nip of the supercalender.

The speed of the supercalender was constant during the tests (ca. 610 m/min), and also the pressure of steam was kept as constant as possible (about 1 bar). The temperature of steam was about 90° C. The amount of the functional chemical solution (liters/hour) was increased during the test in order to increase the coat weight. The concentration of the solution was about 3 wt-%.

Samples were coated with silicone after the supercalender in the laboratory coater. Silicone (Rhodia 3) was applied with a blade and cured immediately after coating. Next, the samples were stored in a humidity chamber (T=50° C., RH 75%), and the rub-off of silicone was tested as a function of time. Acrylic tape was used, because it normally increases the risk for the silicone layer rub-off earlier.
Results Three different functional chemical amounts were applied onto glassine paper. The test point numbers and the consumption of the functional chemical solution are represented in the Table 1. The theoretical maximum amount of functional chemical was also calculated. In reality, the amount is less than the calculated value, because all the solution does not stick onto the paper surface.

TABLE 1

Three different functional chemical amounts were applied on the glassine paper: the test point numbers, the consumption of the functional chemical solution, and theoretical maximum amount of functional chemical.

| Test point | Consumption of solution (l/h) | Maximum of coat weight (g/m²) |
|---|---|---|
| Reference A | 0 | 0 |
| KP 5 | 20 | 0.02 |
| KP 6 | 30 | 0.03 |
| KP 7 | 50 | 0.05 |

The rub-off results are shown in Table 2 as a function of time. In a reference A sample, rub-off is observed after 2 weeks. The differences between the reference A and the samples with lower coat weights were not obvious. In the sample containing theoretically 0.05 g/m² of the functional polymer, no rub-off was observed during the test period.

TABLE 2

The rub-off results for reference and samples containing the functional polymer as a function of time (1 = good quality, no rub off; 2 = rub off detected; and 3 = distinct rub off). All samples were stored in a humidity chamber (a refers to area without tape and b to area under acrylic tape).

| | 0 h | 2 weeks | | 3 weeks | | 4 weeks | | 6 weeks | | 8 weeks | |
|---|---|---|---|---|---|---|---|---|---|---|---|
| Sample | a | a | b | a | b | a | b | a | b | a | b |
| Reference A | 1 | 1 | 2 | 1-2 | 3 | 2 | 3 | 2 | 3 | 2 | 3 |
| KP 5 | 1 | 1 | 1 | 1 | 2 | 1 | 2 | 1 | 3 | 1 | 3 |
| KP 6 | 1 | 1 | 1-2 | 1 | 2-3 | 1 | 3 | 1 | 3 | 1 | 3 |
| KP 7 | 1 | 1 | 1 | 1 | 1 | 1 | 1 | 1 | 1 | 1 | 1 |

Example 2

The test was carried out as in Example 1, but in this experiment the steam applicator was also mounted to the paper machine just before moistening unit.
Results Three different functional chemical amounts were applied onto glassine paper. The test point numbers and the consumption of the functional chemical solution are represented in the Table 3. The theoretical maximum amount of functional chemical was also calculated. In reality, the amount is less than the calculated value, because all the solution does not stick onto the paper surface.

TABLE 3

Three different functional chemical amounts were applied on the glassine paper: the test point numbers, the consumption of the functional chemical solution, and theoretical maximum amount of coating material.

| Test point | Consumption of solution (l/h) | Maximum of coat weight (g/m²) |
|---|---|---|
| Reference B | 0 | 0 |
| KP 1 | 20 | 0.024 |
| KP 2 | 40 | 0.048 |
| KP 3 | 50 | 0.060 |

The rub-off results are shown in Table 4 as a function of time. In a reference B sample, rub-off is observed after 2 weeks. The differences between the reference B and the samples with lower coat weights were not obvious. The sample containing theoretically 0.06 g/m² of the functional polymer had clearly improved anchorage compared to the reference.

TABLE 4

The rub-off results for reference and samples containing the functional polymer as a function of time (1 = good quality, no rub off; 2 = rub off detected; and 3 = distinct rub off). All samples were stored in a humidity chamber (a refers to area without tape and b to area under acrylic tape).

| Sample | 0 h | 2 weeks | | 4 weeks | | 6 weeks | | 8 weeks | |
|---|---|---|---|---|---|---|---|---|---|
| | a | a | b | a | b | a | b | a | b |
| Reference B | 1 | 1-2 | 2 | 1-2 | 3 | 2 | 3 | 2 | 3 |
| KP 1 | 1 | 1-2 | 1-2 | 1-2 | 2 | 1-2 | 3 | 1-2 | 3 |
| KP 2 | 1 | 1 | 1-2 | 1 | 1-2 | 1 | 2 | 1-3 | 3 |
| KP 3 | 1 | 1 | 1 | 1 | 1 | 1 | 1-2 | 1 | 1-2 |

The difference between the coat weights in Example 1 and Example 2 results the different location of the steam application beam.

In summary, the method according to the invention for forming the functional chemical layer by using steam applicator technology enables the application of very low coat weight (ca. 0.05-0.06 g/m²), and when the functional chemical is applied right on the uppermost surface of glassine paper, the silicone rub-off can be prevented.

The invention claimed is:

1. A method for treating a surface of a substrate, said method comprising:
    applying a functional chemical onto the surface of the substrate for improving an adhesion of silicone to said substrate,
    applying said functional chemical in an amount of at least 5 mg/m² onto the surface of the substrate by using a steam application beam configured to apply a uniform coating of the functional chemical in aqueous form with steam to form a functional chemical layer on the substrate, which functional chemical comprises double bonds.

2. The method according to claim 1, wherein the functional chemical comprises a backbone having one or more side chains, wherein at least some double bonds are located at an end of said side chains of said backbone.

3. The method according to claim 1, wherein the functional chemical is applied in an amount of about 0.05 g/m² onto the surface of the substrate.

4. The method according to claim 1, wherein the functional chemical is applied on the surface of the substrate in water in a form of a solution, a dispersion or an emulsion.

5. The method according to claim 1, wherein the functional chemical is applied on a non-coated substrate.

6. The method according to claim 1, wherein the functional chemical is applied on a pre-coated substrate.

7. The method according to claim 1, wherein the functional chemical is applied on a calendered substrate.

8. The method according to claim 1, wherein the substrate is made of paper.

9. The method according to claim 8, wherein the substrate is made of glassine paper.

10. The method according to claim 1, wherein the substrate is made of a film material.

11. The method according to claim 10, wherein the substrate is made of a thermoplastic polymeric material.

12. The method according to claim 11, wherein the thermoplastic polymeric material comprises polyethylene terephthalate, orientated polypropylene, low density polyethylene, or high density polyethylene.

13. The method according to claim 1, further comprising: applying said silicone coating onto said substrate.

14. The method according to the claim 1, wherein the functional chemical comprises functional polymer.

* * * * *